US008418137B2

(12) United States Patent
Hoche et al.

(10) Patent No.: US 8,418,137 B2
(45) Date of Patent: Apr. 9, 2013

(54) ADAPTIVE EVOLUTIONARY COMPUTER SOFTWARE PRODUCTS

(75) Inventors: Michael Walter Hoche, Immenstaad (DE); Horst Roessler, Filderstadt (DE); Peter Szabo, Pforzheim (DE)

(73) Assignee: Alcatel Lucent, Paris (FR)

( * ) Notice: Subject to any disclaimer, the term of this patent is extended or adjusted under 35 U.S.C. 154(b) by 1838 days.

(21) Appl. No.: 11/455,152

(22) Filed: Jun. 19, 2006

(65) Prior Publication Data

US 2007/0033659 A1    Feb. 8, 2007

(30) Foreign Application Priority Data

Jul. 19, 2005  (EP) .................................... 05106615

(51) Int. Cl.
*G06F 9/44* (2006.01)
(52) U.S. Cl. .......................... 717/121; 717/126; 717/127
(58) Field of Classification Search ........................ None
See application file for complete search history.

(56) References Cited

U.S. PATENT DOCUMENTS

| | | | |
|---|---|---|---|
| 5,724,590 A | 3/1998 | Goettelmann et al. | |
| 5,832,205 A | 11/1998 | Kelly et al. | |
| 5,842,017 A | 11/1998 | Hookway et al. | |
| 6,934,933 B2* | 8/2005 | Wilkinson et al. | 717/121 |
| 7,162,715 B1* | 1/2007 | Whittaker et al. | 717/127 |
| 7,272,824 B2* | 9/2007 | Black-Ziegelbein et al. | 717/126 |
| 7,487,494 B2* | 2/2009 | Chan et al. | 717/127 |
| 2002/0029357 A1 | 3/2002 | Charnell et al. | |
| 2002/0104075 A1 | 8/2002 | Bala et al. | |
| 2002/0157086 A1* | 10/2002 | Lewis et al. | 717/127 |
| 2007/0240120 A1* | 10/2007 | Miller et al. | 717/126 |
| 2009/0044173 A1* | 2/2009 | Kohno | 717/121 |

FOREIGN PATENT DOCUMENTS

GB   2 400 937 A   10/2004

OTHER PUBLICATIONS

Jose da Silva e Silva et al. developing Adaptive Distributed Appications: A Framework Overview and Experimiental Results, Lecture Notes in Computer Science, vol. 2888, pp. 1275-1291, 2003. Retrieved on [Jul. 7, 2010], Retrieved from the Internet:URL<http://www.springerlink.com/content/17qjhklh9nq98j3r/fulltext.pdf>.*

Schmidt et al. A Compiler for Creating Evolutionary Software and Application Experience, Stanford University, Stanford, CA, Technical Report: CSL-TR-99-782, Apr. 1999, pp. i-10. Retrieved on [Jul. 7, 2010], Retrieved from the Internet: URL<ftp://reports.stanford.edu/pub/cstr/reports/csl/tr/99/782/CSL-TR-99-782.pdf>.*

(Continued)

*Primary Examiner* — Thuy Dao
*Assistant Examiner* — Cheneca Smith
(74) *Attorney, Agent, or Firm* — Fay Sharpe LLP

(57) ABSTRACT

The invention concerns a method for automatically adapting a computer program product to an environment, the computer program product comprising executable parts and data parts, the method comprising the steps of configuring the computer program product for the environment and executing the software in the environment. Furthermore the method comprises the steps of observing effects of the execution, i.e. metering the behavior, of the executable parts, analyzing the interrelation of the observed effects with the software, and modifying executable parts based on rules in order to reduce undesirable observed effects like in-efficiency or failure. The present invention relates also to the automatically adapting computer program product, and a method for manufacturing the automatically adapting computer program product.

17 Claims, 5 Drawing Sheets

OTHER PUBLICATIONS

Laddaga et al, Introduction to Self-Adaptive Software:Applications, Lecture Notes in Computer Science, 2003, vol. 2614 pp. 275-283, Retrieved on [Jan. 13, 2011] Retrieved from the Internet: URL<http://www.springerlink.com/content/6d3ln6q9n1un2c9c/fulltext.pdf>.*

Oreizy et al, An Architecture-Based Approach to Self-adaptive Software, IEEE Intelligent Systems, May/Jun. 1999, pp. 54-62, Retrieved on [Jan. 12, 2011], Retrieved from the Internet: URL<http://www.cin.ufpe.br/~redis/middleware/oreizy-adaptive99.pdf>.*

Tilevich et al Binary Refactoring: Improving Code Behind the Scenes, ICSE'05, May 2005 pp. 264-272, Retrieved on [Sep. 20, 2011] Retrieved from the Internet: URL<http://delivery.acm.org/10.1145/1070000/1062511/p264-tilevich.pdf?ip=151.207.242.4&CFID=42482639&CFTOKEN=79548074&_acm_=1316537606_3af1ccbe7d8e190f89e4c464e06125b2>.*

Wang, Qianxiang. Towards a rule model for self-adaptive software, ACM SIGSOFT Software Engineering Notes, Jan. 2005, Retrieved on [Nov. 27, 2012] Retrieved from the Internet: URL<http://dl.acm.org/citation.cfm?id=1039198>.*

Bernon et al. Adelfe: A methodology for adaptive multi-agent systems engineering, Lecture Notes in Computer Science vol. 2577, 2003, pp. 156-169, Retrieved on [Nov. 27, 2012] Retrieved from the Internet: URL<http://link.springer.com/chapter/10.1007%2F3-540-39173-8_12?LI=true#>.*

Kephart J. O. et al: "The Vision of Automatic Computing." IEEE Computer Society, Jan. 2003, pp. 41-50.

IBM: "Automatic Computing—IBM's Perspective on the State of Information Technology." Online—http://www.ibm.com/research/autonomic. Oct. 2001.

Bala, V. et al., "Transparent Dynamic Optimization: The Design and Implementation of Dynamo," Hewlett-Packard Laboratories, Palo Alto, CA, US, Jun. 1999, HPL-1999-78, XP002294187, 102 pgs.

Extended European Search Report mailed Apr. 7, 2006.

* cited by examiner

ADAPTIVE EVOLUTIONARY COMPUTER SOFTWARE PRODUCTS

FIELD OF THE INVENTION

The present invention relates to a method for automatically adapting a computer program product to an environment, the automatically adapting computer program product, and a method for manufacturing the automatically adapting computer program product.

The invention is based on a priority application, EP 05106615.7, which is hereby incorporated by reference.

BACKGROUND OF THE INVENTION

In the primitive settings of early computing, the program complexity was so small that one person's mind could fully embrace the whole of a program's activity down to the least details. Now, the human faculties haven't evolved since, whereas the capacities of computers have increased at a sustained geometric progression. To benefit from the technological progress, ever more abstract conceptual tools and programming languages had to be developed and used.

Great as the progress made by the individual programmer may be, the level of complexity has been long exceeded beyond which no one can conceive the entirety of a program that would take full advantage of existing computers. It is therefore of utmost importance to develop methods of exchange, cooperation, accumulation, construction, so as to elaborate complex programs; such is the field of software engineering.

In mid-October 2001, IBM released a manifesto pointing out that the difficulty of managing today's computing systems goes well beyond the administration of individual software environments. The need to integrate several heterogeneous environments into corporate-wide computing systems, and to extend that beyond company boundaries into the Internet, introduces new levels of complexity. Computing systems' complexity appears to be approaching the limits of human capability, yet the march toward increased interconnectivity and integration rushes ahead unabated.

In the article "The Vision of Autonomic Computing" of Jeffrey O. Kephart and David M. Chess published by the IEEE Computer Society, January 2003, it is suggested to create systems managing themselves according to an administrator's goal. New components integrate as effortlessly as a new cell establishes itself in the biologic systems.

The essence of autonomic computing systems is self-management, the intent of which is to free system administrators from the details of system operation and maintenance and to provide users with a machine that runs at peak performance. Like their biological namesakes, autonomic systems will maintain and adjust their operation in the face of changing components, workloads, demands, and external conditions and in the face of hardware or software failures, both innocent and malicious.

The autonomic system might continually monitor its own use, and check for component upgrades. If it deems the advertised features of the upgrades worthwhile, the system will install them, reconfigure itself as necessary, and run a regression test to make sure all is well. When it detects errors, the system will revert to the older version while its automatic problem determination algorithms try to isolate the source of the error. The authors cite four aspects of self-management:

TABLE 1

| Concept | Current computing | Autonomic computing |
| --- | --- | --- |
| Self-configuration | Corporate data centers have vendors and platforms. Installing, configuring, and integrating systems time consuming and error prone. | Multiple Automated configuration of components and systems follows high-level policies. Rest of system adjusts is automatically and seamlessly. |
| Self-optimization | Systems have hundreds of manually set, nonlinear tuning parameters, and their number increases with each release. | Components and systems continually seek opportunities to improve their own performance and efficiency. |
| Self-healing | Problem determination in large, complex systems can take a team of programmer weeks. | System automatically detects, diagnoses, and repairs localized software and hardware problems. |
| Self-protection | Detection of and recovery from attacks and cascading failures is manual. | System automatically defends against malicious attacks or cascading failures. It uses early warning to anticipate and prevent system wide failures. |

Multiple application scenarios found, e.g. in pervasive and ubiquitous computing, have one aspect in common: software will be confronted with continuously changing execution environments. To guarantee seamless service, protocols, infrastructure, and applications will have to be able to adapt to changes in. e.g., networks, system configuration, available resources, varying policies, etc. In other words, adaptation will have to be a key feature of any mobile software system.

The vision of automatic computing and the problem of getting rid of a-posteriori functional and structural requirements are solved by a method for automatically adapting a computer program product to an environment. A computer program usually comprises executable parts and data parts. The method for automatically adapting a computer program product to an environment comprises the steps of configuring the computer program product for the environment and executing the software in the environment, where effects of the execution are observed inside the program, i.e. the behavior itself, i.e. the executable parts, analyzing the inter-relation of the observed effects with the software, and modifying executable parts based on rules in order to reduce undesirable effects.

The target is reached inter alia by a computer program product automatically adapting to an environment, the computer program product comprising executable parts and data parts, the computer program product comprising configuration means for configuring the computer program product for the environment for executing the computer program product in the environment, where the computer program product comprises observation means for observing effects of the execution, i.e. the behavior of the executable parts, inference means for analyzing the inter-relation of the observed effects with the computer program product, and restructuring means for modifying executable parts based on rules in order to reduce undesirable effects.

And the target is reached by a method for manufacturing such an automatically adapting computer program product, the method comprising the steps of furnishing the executable part by integrating observation means for observing effects of the execution, i.e. the behavior, of the executable parts, furnishing the executable part by inference means for analyzing the inter-relation of the observed effects with the software, and furnishing the executable part by restructuring means for modifying executable parts based on rules in order to reduce undesirable effects.

In other words it is suggested to replace the usual static software design which is not well suited for e.g. pervasive and ubiquitous computing in an everyday changing environment with a design allowing evolving requirements by applying program transformation techniques, interpreters, abstract (virtual) machines, compiler techniques, intelligent agent technology, and higher order programming. The adaptation, modification, and restructuring of e.g. agents (individuals, autonomous services, i.e. independent software pieces) enables them to run within an environment of evolving (changing) requirements. Note that in this context the words configuration and adaptation as well as modification become synonym.

SUMMARY OF THE INVENTION

The basic idea is a morphing capability, meaning the ability to dynamically modify its runtime. Morphing (or evolving) is a kind of practice effect, where a set of individuals (instances, agents) are involved in performing a certain task, training themselves to enhance their capabilities in solving a task.

The invention is also a manufacturing method, preferably implemented as computer software, and a computer software product with a system architecture where the components or parts are treated as self-organizing individual entities restructuring themselves stimulated by outside interactions that are observed inside. Therefore the computer software product comprises observable and evolving components for observing behavior and changing themselves.

This has the advantage that the product is self-evolving software. The manufacturing method enables an improved effective rapid prototyping. The product itself is able to dynamically adapt to changing environments and requirements. This results in a reduction of development effort for necessary adaptations and modifications and will increase development speed. The technique allows creating self-repairing software. The usual development process is simplified and becomes more interactive and iterative. And last but not least the dynamic evolving software components will speed up software and networking technology, e.g. as a base for semantic networks, since there is a missing technology in the agent community, namely beside the delegation of a request for a certain functionality, the real transfer of this functionality to the requesting entity. The invention is also suited to automatically reduce the software entropy, yielding to improved software designs. All these and many other advantages could be reached by applying the invention by the price of a morphing environment and computational resources.

The objects of the invention are carried out in the following by comparing the traditionally applied technologies and the methods according to the invention, and how their application will result in a computer software product according to the invention.

DETAILED DESCRIPTION OF THE INVENTION

Usually a computer software product comprises two parts: a data part for storing and presenting information as well as carrying functional states. In usual programming languages these are e.g. presented as values of variables. Today, the data part often is usually based on data types, objects, and even on databases that could make objects persistent. Higher programming languages and especially the non-imperative ones, like ProLog or LISP blur this separation into two parts. Nevertheless it is almost possible to distinguish between parts that contribute to memorize a state, i.e. a certain program configuration. And parts that contribute things that if evaluated (another term for execution) change these states, see e.g. any kind of formal semantics description like an operative one, or a logic semantic, or even declarative semantics.

Code transformation for instance, as well as any application of higher order programming or self-modifying code is an exceptional case in this definition, the transformation seems to be an executable part and the code the data part, although the code is executable. The definition of the parts has the context which part indeed is executed, i.e. is able to change an (abstract) machine configuration from an operational semantics perspective. The model is in the following simplified and understood as operations, the code part, that are able to change a machine's state, the data part. In short: Operations causes actions that become manifest in state changes.

Self-modifying code is known as a piece of software, which achieves its goal by rewriting itself as it goes along. It is almost universally considered harmful and ugly, now, but it used to be a neat trick in the toolbox of programmers.

Figure 1:
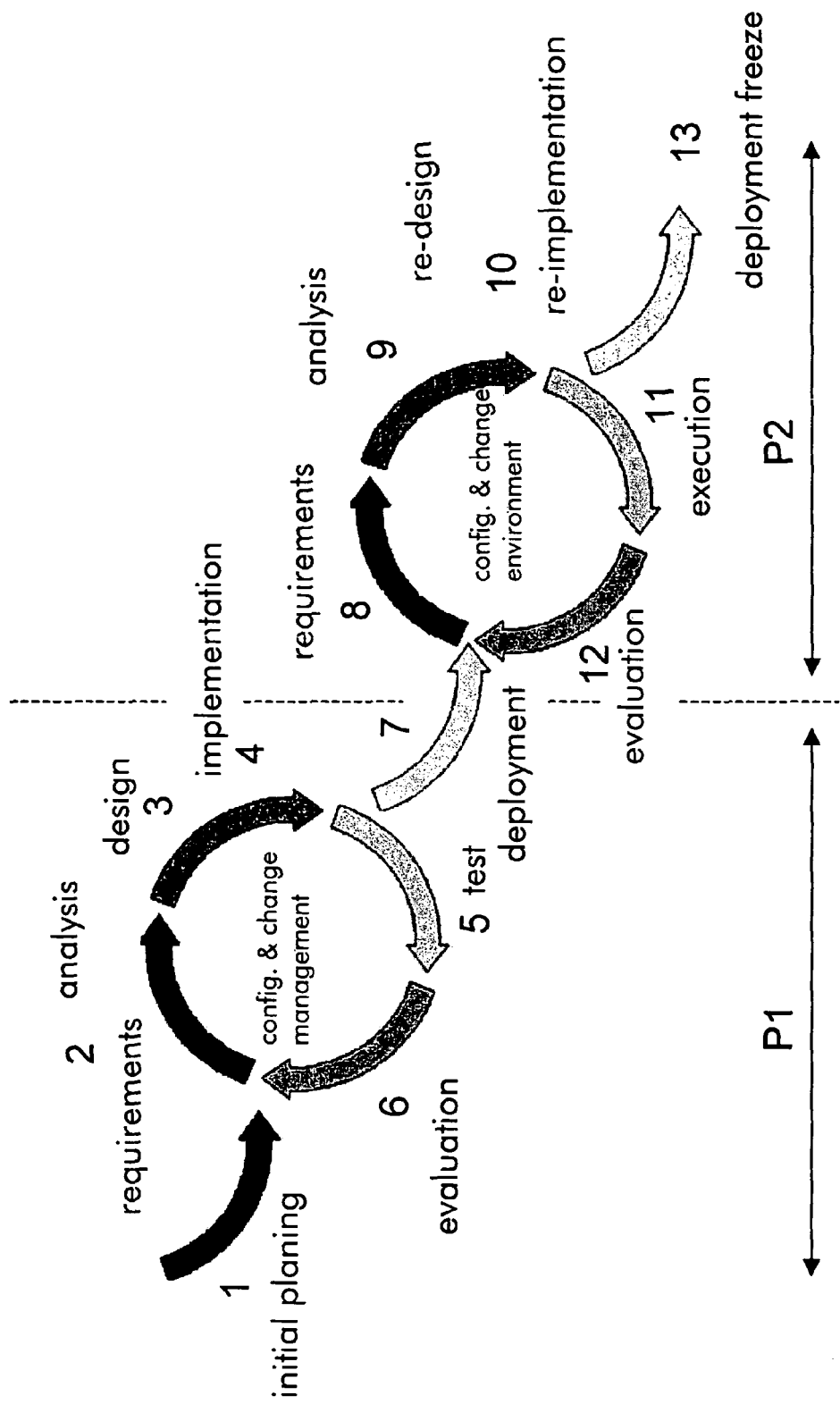
FIG. 1 shows a schematic drawing of the manufacturing method according to the prior art and according to the invention.
Figure 2:
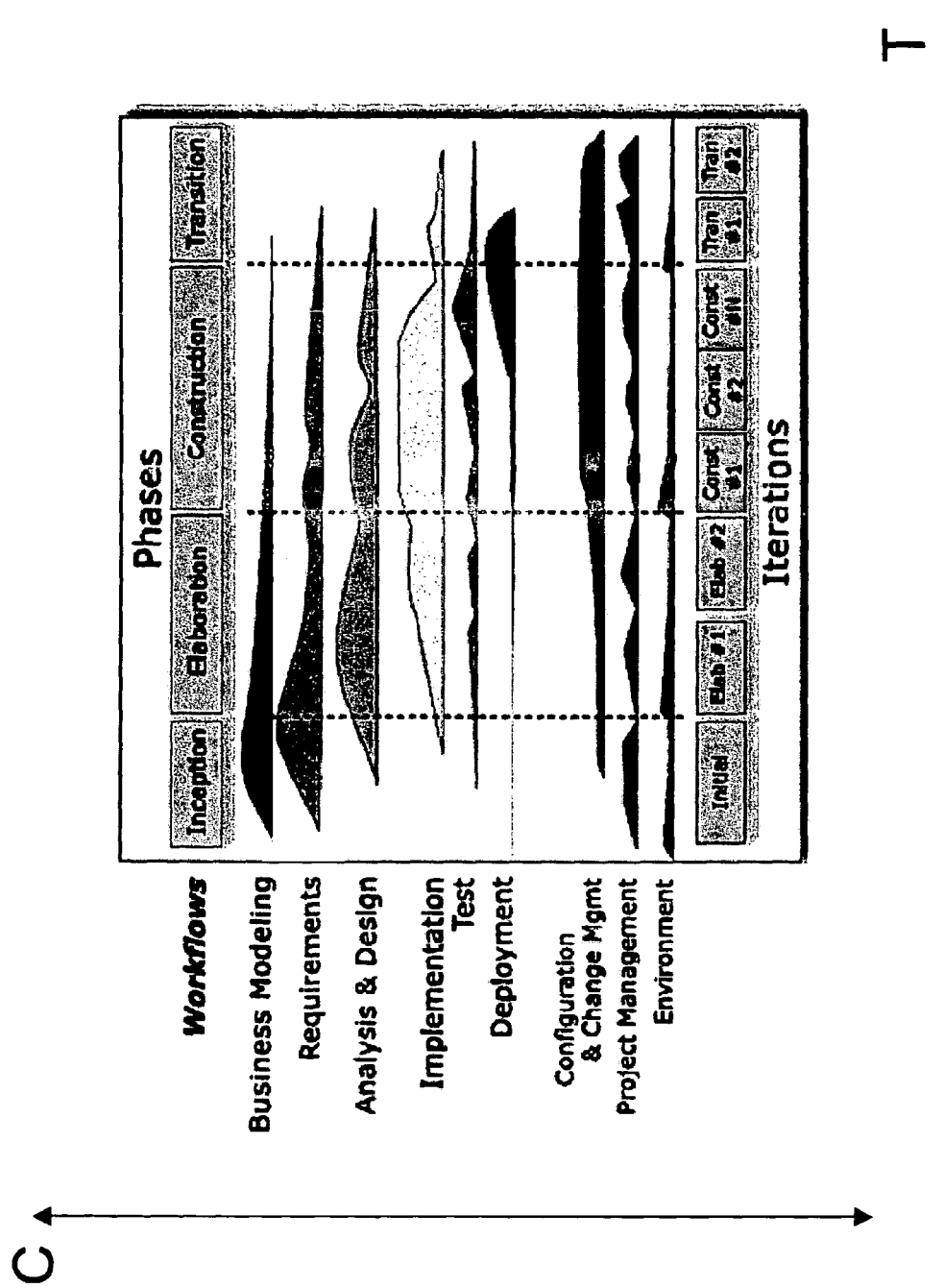
FIG. 2 shows a diagram of the efforts of different phases of an iterative manufacturing process.

FIG. 1 shows on the left hand side an exemplary iterative software creation process. It starts with initial planning 1, followed by a requirement analysis 2 and a design 3, i.e. more or less the translation of required functionality into an architectural description. The result can be implemented 4, i.e. reformulated in terms of the programming environment, resulting in an implementation that could be tested 5 against the requirements, i.e. against expected functionality. Discrepancies are finally analyzed and evaluated 6 resulting in additional requirements. And another cycle begins. Finally when the coverage of the requirements is so complete, the software product is deployed 7, i.e. distributed for operation which could be regarded as transition from a creation phase P1 to an operative phase P2.

Within the operative phase P2 as indicated in the problem statement usually further requirements occur and several others disappear. Supposing that the software product is able itself to establish further iterations in order to adapt to the changed requirements, the process is continued with another requirement analysis 8, followed by a re-design 9, and a re-implementation 10. This re-implementation could be executed 11 for testing and metering, and finally evaluating 12 if the modifications succeed in covering the additional requirements. Obviously this process is also iterative yielding to an evolving software product. The re-implementations are versions or releases of the software product and in order to enable evolution tracing and back-track evolution it is preferred to make a re-implementation persistent, i.e. to freeze an intermediate deployment 13.

Central to any process of building software is the coding of programs. To enhance these processes, is to relieve the programmer from all repetitive and conceptually redundant actions, so that he may focus on the essence of programming, that is, on problems that have not been solved.

The theory of the art of programming programs that read, transform, or write other programs, subsuming concepts functor programming, macro programming, appears naturally in the chain of software development, where it plays an essential role, be it "only" under the form of compilers, interpreters, debuggers. However, meta-programming was never integrated in the processes of development, and gaining awareness (i.e. software internal observable properties) of its role is a progress in this domain.

Adding orthogonal persistence of (programming) objects is another progress. The deployment freeze 13 forces this orthogonal persistence, a property in which objects persist until they are needed no more, compilation and administration of program binaries with automatic consistency management of dynamically optimized code, user-interface-driven programming with structure-driven user-interfacing, explicit manual networking with implicit automatic distribution.

The operative phase requires meta-programming. Meta-programming is the activity of manipulating programs that in turn manipulate programs. The phase also requires reflection. Reflection is the ability of systems to know enough about themselves so as to dynamically metaprogram their own behavior, so as to adapt themselves to changing circumstances, so as to relieve programmers and administrators from so many tasks that currently need to be done manually.

Reflection allows dynamic extension of system infrastructure. Without reflection it is necessary to re-build a new system and e.g. re-boot every time the infrastructure changes.

At the technical level, all these mean interruption of service, unreliability of service, denial of service, and unawareness of progress; but at the psycho-social level, lack of reflection also means that people will have to make irreversible static infrastructural choices and close their mind to infrastructural change. Reflection is a technical benefit, but also a psychosocial requirement, that allows individual progress despite historical choices by evolution of the conceptual infrastructure, and community progress despite variety of individual and unshared backgrounds by unification of use cases.

The real challenge is to build a system that can consistently coordinate separately developed features that each tackle very different aspects of computing with respect to the other features. A high-level programming language like LISP is capable of expressing both: logical reasoning (including quotients) and computational reflection, i.e. being able to specify, implement, and verify arbitrarily complex a posteriori relationships between separate software components.

Figure 3:
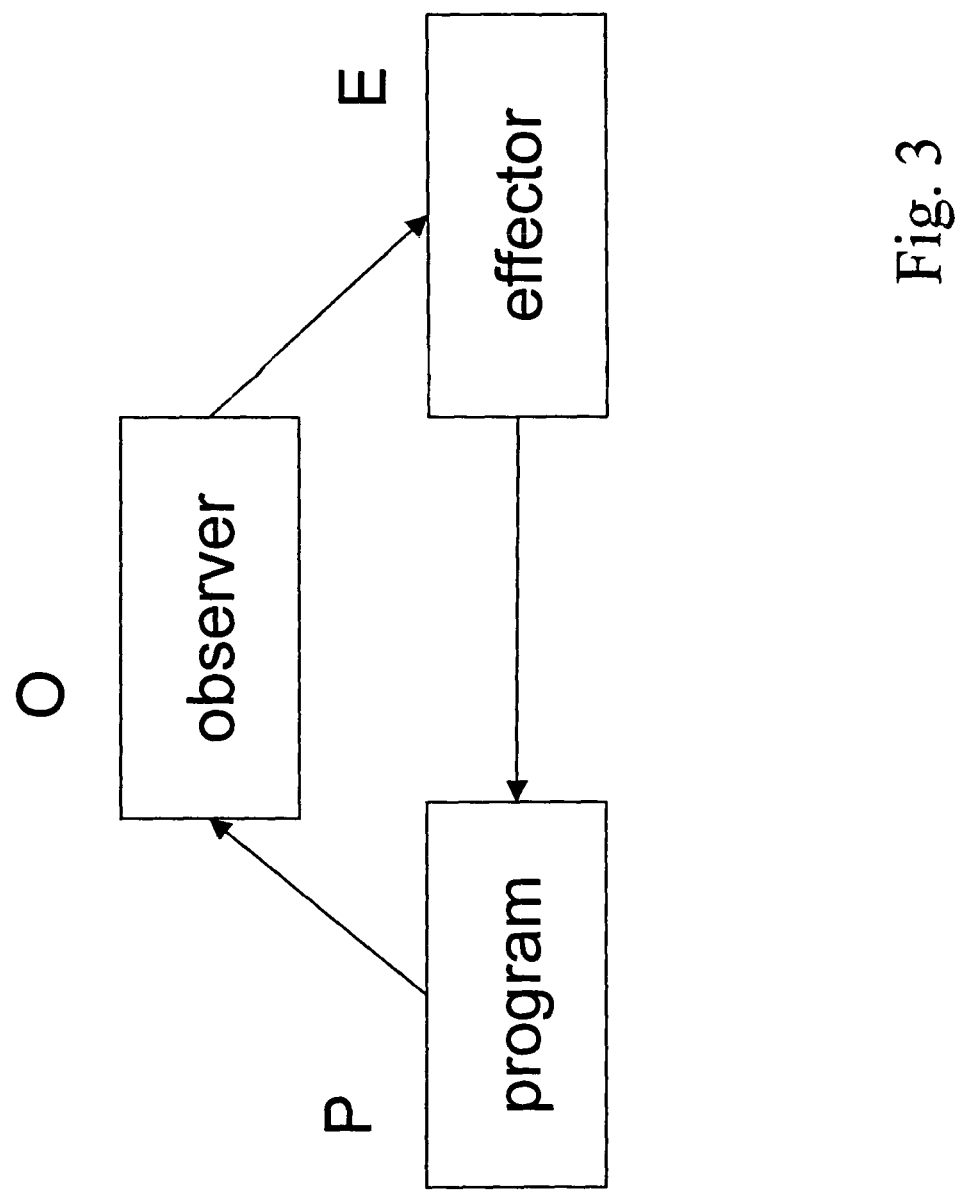
FIG. 3 shows a schematic drawing of the coarse architecture of the computer software product according to the invention.

FIG. 3 shows a coarse architecture that is able to cope with meta-programming and reflection. An as usual developed software product, say a program P is observed by an observer O, depicted by the arrow between the program P and the observer O. The observer has a kind of consciousness or awareness about what happened when the program is executed. Whenever the observation matches to a meta-programming rule an effector E is triggered from the observer O to re-(con)struct the program P. This generic architecture and the generic collaboration enable the vision of self-modifying code.

Figure 4:
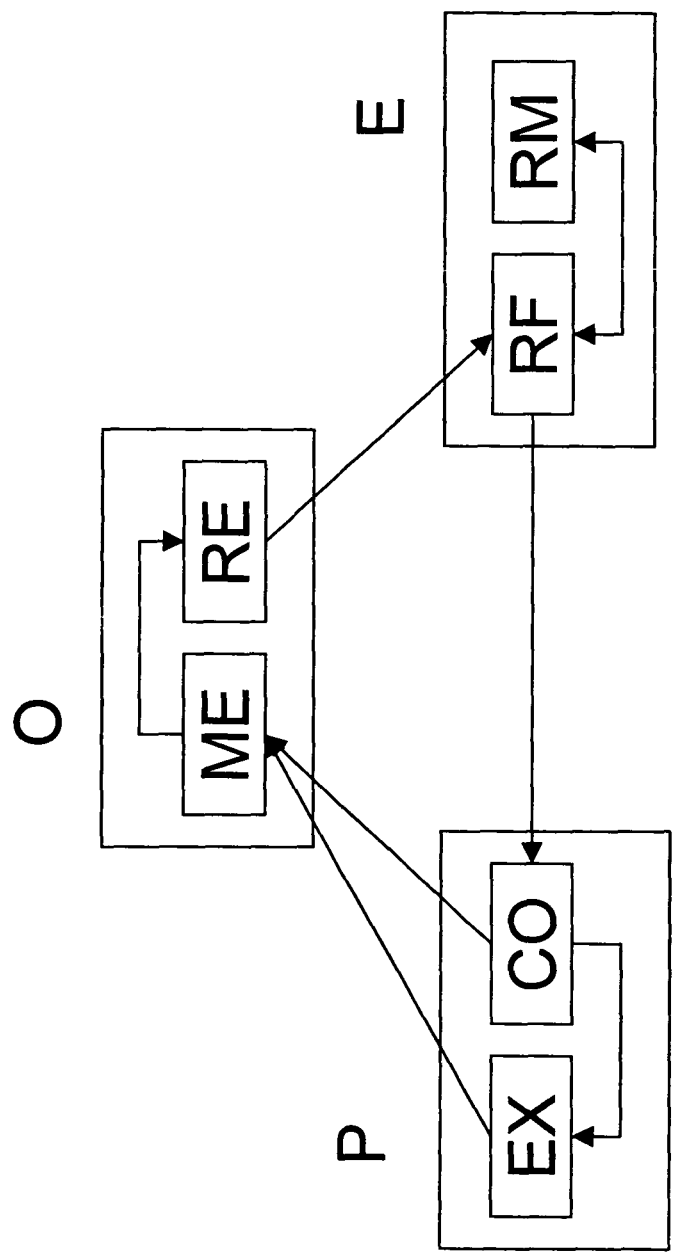
FIG. 4 shows a schematic drawing illustrating the collaboration of components of the coarse architecture according to the method according to the invention.

FIG. 4 refines this architecture. The program P comprises an executable part EX that is instrumented for measurements that are performed by a measurement component ME forming a part of the observer O. The measurements are evaluated, e.g. by comparing the measurements with re-factoring heuristics at a recognizer RE. When a re-factoring is indicated, a refractory component, part of the effector E, is triggered to restructure e.g. the code CO from that a new executable could be derived. And the refractory component could log its actions and to make old and new revisions persistent, managed by a revision manager component RM.

In the following it is exemplary outlined how to instrument a LISP program P to show the feasibility of such an observer O. New to this approach is to limit the observer on observable software properties, only, and not trying to observe how the software fits into the environment of the software.

It is straightforward to translate this technique to another programming paradigm like the logic programming, e.g. to use the "reassert" built in predicate to restructure a logic program and to instrument the clauses by adding appropriate constrained variables to the predicates in ProLog. Within Smalltalk—representing the object oriented programming paradigm—the instrumentation could be integrated in the development environment or in the object meta class.

In LISP, the definition operators could be adapted to instrument LISP code, e.g. by observing data parts as a software property, which is in the example an observation of LISP variables

TABLE 10

```
(defclass DEFVAR-Class ( )
   ((number-of-vars :allocation :class
                    :initform 0
                    :accessor number-of-vars)
    (variable-list :allocation :class
                    :initform (make-hash-table :test 'equal)
                    :accessor variable-list)
    (name :initform nil
          :initarg :name
          :accessor name)
    (value :initform nil
           :initarg :value
           :accessor value)
    (file :initform ""
          :initarg :file
          :accessor file)))
;; etc
(defmethod initialize-instance :after ((defvar-obj DEFVAR-Class)
&rest args)
   (declare (ignore args))
   ;(incf (slot-value defvar-obj 'number-of-vars))
   )
(defmethod morph-insert-into-varlist ((defvar-obj DEFVAR-Class))
   (with-slots (name variable-list) defvar-obj
      (let ((inst (gethash name variable-list)))
         (setf (gethash name variable-list) defvar-obj)
         (if (not inst)
            (incf (slot-value defvar-obj 'number-of-vars)))
            ;(format t "registering ~s in variable-list~%" name)
   )))
(defmethod morph-remove-from-varlist ((defvar-obj DEFVAR-Class))
   (with-slots (name variable-list) defvar-obj
      (when (gethash name variable-list)
         (remhash name variable-list)
         (decf (slot-value defvar-obj 'number-of-vars))
         ;(format t "removing from variable-list: ~s~%" name)
   )))
```
The DEFVAR-Class has several slots modelling exemplary properties of variables and several methods to modify these tags, i.e. to maintain the consistence of such description objects.

TABLE 11

```
(defun morph-var-instance (var-name)
   (let* ((proto (class-prototype (find-class 'DEFVAR-Class))))
      (and proto (gethash var-name (variable-list proto)))))
(defun morpf-var-statistic (variable-name slot-name)
   "Returns the value of the slot-name of the defvar-instance"
   (let* ((proto (class-prototype (find-class 'DEFVAR-Class)))
          (instance (and proto (gethash variable-name (variable-list
             proto)))))
      (cond ((and instance (equal variable-name (name instance)))
             (slot-value instance slot-name))
            (t (format t "variable ~s not found~%" variable-name)))))
(defmacro defvar* (name &optional
                      (initial-value nil initial-value-p)
                      (documentation nil documentation-p))
;;----------------------------------------------------------
   ;;;(register-defun name lambda-list forms)
   (let ((inst (make-instance 'DEFVAR-Class
                      :name name
                      :value initial-value
                      :file "/usr/morphing/foo.lisp")))
      (morph-insert-into-varlist inst))
;;(print "registering DEFVAR in variable-list")
;;----------------------------------------------------------
   '(progn (declaim (special ,name))
         ,(when initial-value-p
            '(unless (boundp ',name)
               (setf (symbol-value ',name) ,initial-value)))
         ,(when documentation-p
            '(setf (documentation ',name 'variable) ',documentation))
         ',name))
```

The programming environment is enhanced by the macro defvar*, which creates descriptive object when defining a variable.

Typically the consistent renaming of a variable, the detection whether a variable was initialized correctly, or the use of a variable is difficult to handle. This rather primitive observer is able to cope with this difficulty and allows for instance to explore the initial value of a variable by (morph-var-statistic 'x' value).

The observer DEFVAR-Class is a data structure capable of storing properties of variables like their location, their use, the value—in general all internal observable properties, even relationship between variables.

The language itself is extended by the macro defvar* instrumenting the observer when defining a variable. It is more difficult to observe the relationship between functions which is exemplary shown by the next code excerpt:

In order to implement dynamic, adaptive software systems, the programming languages are extended to support reflection; called awareness. That comprises support for dynamic modification of behavior, i.e. self-modifying code, or a mutable meta object protocol. And macros in LISP seem to be the right tool to do that.

The DEFUN-Class models the function defined by defun. An instance of DEFUN-Class "knows" its syntactic forms (name, signature, body, . . . ), its file location. Furthermore the names of the functions, which triggers this function and the names of the functions, which are triggered by this function, as an example of a relationship. Anytime a function is defined with the macro defun* an instance of this class will be created and inserted into the protocol of the class-variable function-list. During program development instances of this class acquire knowledge about themselves and give information to the "awareness"-layer to support reasoning about the current structure of the program. As an example application this is illustrated by the following package

TABLE 12

```
(defpackage :Memoization
   (:nicknames :Memo)
   (:use :common-lisp)
   (:export :Def-Memo-Fun
      :Memoize
      :Memoize-Functions
      :Unmemoize
      :Unmemoize-Functions
      :Unmemoize-All-Functions
      :Rememoize
      :Rememoize-Functions
      :Clear-Memo-Table
      :Clear-Memo-Tables
      :Save-Memo-Table
      :Memoized-Function-Call-Count
      :Memoized-Time
      :With-Memoization
      :Without-Memoization
      :Memoized-Function-Names
      :Compile-Memoization-System
      :Load-Memoization-System
      :Time-Form))
(defpackage :morph
   (:use :common-lisp
      :Memoization)
   (:export :defun*))
;; ---------------- load something ---------------------------------
(defvar *morph-path* "D:/Documents and
Settings/li62794/Desktop/programming/")
(defvar *memo-package* (concatenate 'string *morph-path* "Load-
Memoization.lisp"))
(load *memo-package*)
;; In order to implement dynamic, adaptive software systems, programming
;; languages must support REASONING ABOUT THEIR OWN STRUCTURE,
;; PERFORMANCE, AND ENVIRONMENT (often called "reflection"), here
called
;; "awareness".
;; Furthermore, there must be support for dynamic modification of behavior
;; (think self-modifying code, or a "mutable MOP (Meta Object Protocol)").
```

TABLE 12-continued

```
;; Finally, this should all be efficient; in particular, code that does not make use
;; of self reflection or modification should not take a performance hit.
;;------------------------------------------------------------------------------
;; DEFUN-Class models the function defined by defun.
;; An instance of DEFUN-Class
;; "knows" its syntactic forms (name, signature, body, ...), its file location.
;; Furthermore the names of the functions, which triggers this function and the
;; names of the functions, which are triggered by this function. Anytime a function
;; is defined with the macro <defun*> an instance of this class will be created and
;; inserted into the protocol of the class-variable <function-list>. During
;; program development instances of this class acquire knowledge about
;; themselves and give information to the "awareness"-layer to support
;; reasoning about the current structure of the program.
(in-package :morph)
;; ------------------------------------ utils --------------------------------
(defun split-body-into-parts (body)
    "Returns the declares, the doc string, and any forms in BODY."
    (flet ((ret (dec doc body)
            (return-from split-body-into-parts (values dec
                                    (when doc
                                        (list doc))
                                    body))))
       (loop
         with doc-string = nil
         with declares = '( )
         for form* on body
         for form = (car form*)
         do (cond
             ((and (stringp form) (cdr form*))
              (setf doc-string form))
             ((stringp form)
              (ret declares doc-string form*))
             ((and (consp form) (eql 'cl:declare (car form)))
              (push form declares))
             (t
              (ret declares doc-string form*))))))
;; ---------------------------------------- DEFUN awareness ------------------
(defclass DEFUN-Class ( )
    ((nr-of-defuns :allocation :class
                :initform 0
                :accessor nr-of-defuns)
     (function-list :allocation :class
                :initform (make-hash-table :test 'equal)
                :accessor function-list)
     (call-stack :allocation :class
                :initform nil
                :reader call-stack)
     (callers :initform nil
                :initarg :callers
                :reader callers)
     (callees :initform nil
                :initarg :callees
                :accessor callees)
     (nr-of-funcalls :initform 0
                :initarg :nr-of-funcalls
                :accessor nr-of-funcalls)
     (name :initform nil
           :initarg :name
           :accessor name)
     (comments :initform ""
                :initarg :comments
                :accessor comments)
     (parameters :initform nil
                :initarg :parameters
                :accessor parameters)
     (logic :initform nil
           :initarg :logic
           :accessor logic)
     (memoized-logic :initform nil
                :initarg :memoized-logic
                :accessor memoized-logic)
     (recursive-p :initform nil
                :initarg :recursive-p
                :accessor recursive-p)
     (file :initform ""
           :initarg :file
```

TABLE 12-continued

```
      :accessor file)))
(defmethod initialize-instance :after ((defun-obj DEFUN-Class) &rest args)
   (declare (ignore args))
   ;(incf (slot-value defun-obj 'nr-of-defuns))
   ;; or is this better??
   ;; (with-slots (nr-of-defuns) defun-obj
   ;; (incf nr-of-defuns))
   )
(defmethod (setf nr-of-funcalls) :after (value (defun-obj DEFUN-Class))
   "triggers a reaction if this slot has been changed"
   (declare (ignore value))
   ;(format t "nr-of-funcalls = ~a~%" (nr-of-funcalls defun-obj))
   )
(defmethod reset-statistics ((defun-obj DEFUN-Class))
   "resets numbers-of callers, etc. to init values"
   (with-slots (name callers callees nr-of-funcalls) defun-obj
      (setf callers nil)
      (setf callees nil)
      (setf nr-of-funcalls 0)
   ;(format t "clearing instance of ~a~%" name)
   ))
(defmethod morph-insert-into-funlist ((defun-obj DEFUN-Class))
   (with-slots (name function-list) defun-obj
      (let ((inst (gethash name function-list)))
         (setf (gethash name function-list) defun-obj)
         (if (not inst)
            (incf (slot-value defun-obj 'nr-of-defuns)))
         ;(format t "registering ~s in function-list~%" name)
       )))
(defmethod morph-remove-from-funlist ((defun-obj DEFUN-Class))
   (with-slots (name function-list) defun-obj
      (when (gethash name function-list)
         (remhash name function-list)
         (decf (slot-value defun-obj 'nr-of-defuns))
         ;(format t "removing from function-list: ~s~%" name)
       )))
(defmethod morph-enter-call-stack ((defun-obj DEFUN-Class))
   (with-slots (name callees function-list call-stack recursive-p) defun-obj
      (let* ((top-name (first call-stack))
             (top-name-instance (and top-name (gethash top-name function-list))))
         (cond ((and top-name-instance
                     (not (member name (slot-value top-name-instance 'callers))))
                (push name (slot-value top-name-instance 'callers)))
               ((and top-name-instance
                     (not (member top-name callees)))
                (push top-name callees))
               (t ( )))
         (when (and (equal top-name name)
                    (not recursive-p)) ;;mark as a recursive function
            (setf recursive-p t))
         (push name call-stack))))
(defmethod morph-leave-call-stack ((defun-obj DEFUN-Class))
   (with-slots (name function-list call-stack) defun-obj
      (let ((top-name (first call-stack)))
         (if (equal top-name name)
            (pop call-stack)))))
(defmethod morph-memoize ((defun-obj DEFUN-Class) &key
                          (Test #'equal)
                          (Key #'identity)
                          (Hash-Table-Source :Create))
   "TRUE MORPHING!! Replaces the body of the original function by a NEW one!"
   (with-slots (name parameters logic memoized-logic) defun-obj
      (setf memoized-logic
         '(let ((Hash-Table (ecase Hash-Table-Source
                             (:Create (make-hash-table :test Test))
                             (:Disk (Load-Saved-Memo-Table name))
                             (:Old-Function (get Function-Name :Memo-Table)))))
            (setf (get name :Memo-Table) Hash-Table)
            (setf (get name :Unmemoized-Function) Function)
            (setf (get name :Memo-Table-Test) Test)
            (proclaim '(notinline ,name))
            (declare (optimize (speed 3) (compilation-speed 0) (space 0)
#+:allegro(debug 0) (safety 0)))
            (let ((Hash-Key (funcall Key parameters)))
               (multiple-value-bind (Value Found?)
                  (gethash Hash-Key Hash-Table)
                  (cond
                     (Found?
```

TABLE 12-continued

```
                        (incf (the fixnum (get name :Hash-Table-Lookups)))
                        Value)
                       (t
                        (incf (the fixnum (get name :Original-Function-Calls)))
                        (setf (gethash Hash-Key Hash-Table) ,logic) ))))))
      (Memoize name)))
(defun morph-measure-memoization (function-name args)
  "yields two values: the computed result and the time difference
   between the unmemoized (origin) and the memoized version"
  (let ((start1 0)
        (time1 0)
        (start2 0)
        (time2 0)
        (return-val nil))
    (setq start1 (get-internal-real-time))
    (setq return-val (funcall function-name args))
    ;; the time the origin function nedded
    (setq time1 (- (get-internal-real-time) start1))
    '(progn
      (Memoize ,function-name)
      (setq start2 (get-internal-real-time))
      (funcall function-name args)
      ;; the time the memoized function nedded
      (setq time2 (- (get-internal-real-time) start2))
      (Unmemoize ,function-name))
    ;; result and time-difference
    (values return-val (/ (- time1 time2) (* 1.0 internal-time-units-per-
second))))))
(defun morph-funcall (function-name)
  "First check if the <name> is a morphing function.
   Than increase the counting slot <nr-of-funcalls>
   than update callers and callees list using the <call-stack>"
  (let* ((proto (clos:class-prototype (find-class 'DEFUN-Class)))
         (instance (and proto (gethash function-name (function-list proto)))))
    (cond ((equal function-name (slot-value instance 'name))
           (setf (nr-of-funcalls instance) (+ (nr-of-funcalls instance) 1))
           (morph-enter-call-stack instance))
          (t (format t "morph-funcall: function ~s~% not found" function-
name)))))
(defgeneric defun-entry-handler (name args)
  ;; define EQL methods on this if you want.
  (:method ((name t) args)
           (declare (ignore args))
           ;(format *trace-output* "~&Enter ~S ~:S~%" name args)
           (morph-funcall name)))
(defgeneric defun-exit-handler (name args &optional aborted)
  ;; ABORTED will be true if the call is being aborted by a non-local
  ;; exit of some kind.
  ;; define EQL methods on this if you want
  (:method ((name t) args &optional (aborted nil))
           (if aborted
               (format *trace-output* "~&Exit ~S ~:S~:[~; (aborted)~]~%" name
args aborted))
           (let* ((proto (clos:class-prototype (find-class 'DEFUN-Class)))
                  (instance (and proto (gethash name (function-list proto)))))
             (when instance
               (morph-leave-call-stack instance)))))
(defmacro define-morphed-function (name arglist &body body)
  (let ((argsn (make-symbol "ARGS"))
        (abortedn (make-symbol "ABORTED")))
    '(defun ,name (&rest ,argsn)
       (declare (dynamic-extent ,argsn)) ;is this safe? What??
       (let ((,abortedn t))
         (unwind-protect
             (progn
               (defun-entry-handler ',name ,argsn)
               (multiple-value-prog1
                (block ,name
                  (apply #'(lambda ,arglist ,@body)
                         ,argsn))
                (setf ,abortedn nil)))
           (defun-exit-handler ',name ,argsn ,abortedn))))))
(defmacro defun* (name arglist &body body)
  "Injects morhing instrumentation into the function definition"
  (multiple-value-bind (dec doc bod) (split-body-into-parts body)
    '(let ((foo (define-morphed-function ,name ,arglist ,@body))
           (defun-instance (make-instance 'DEFUN-Class
                                          :name ',name
                                          :parameters ',arglist
                                          :comments ',(car doc)
```

TABLE 12-continued

```
                        :logic `,(car bod)
                        :file "/usr/morphing/foo.lisp")))
        ;;;(register defun: name arglist body)
        (if foo (morph-insert-into-funlist defun-instance))
        foo)))
(defmacro define-cloned-function (cname arglist &body body)
    (let ((argsn (make-symbol "ARGS")))
        `(defun ,cname (&rest ,argsn)
            (declare (dynamic-extent ,argsn))
            (if (t) ;;stack-top = cname
                (multiple-value-prog1
                    (block ,cname
                        (apply #'(lambda ,arglist ,@body)
                            ,argsn))))))))
(defun morph-fun-instance (function-name)
    (let* ((proto (clos:class-prototype (find-class 'DEFUN-Class))))
        (and proto (gethash function-name (function-list proto)))))
(defun morph-func-statistic (function-name slot-name)
    "Returns the value of the slot-name of the function-instance with name
function-name"
    (let* ((proto (clos:class-prototype (find-class 'DEFUN-Class)))
            (instance (and proto (gethash function-name (function-list proto)))))
        (cond ((and instance (equal function-name (name instance)))
                (slot-value instance slot-name))
            (t (format t "function ~s not found~%" function-name)))))
```

The awareness class models the observed properties of a function, i.e. the role, the relationship to other parts and the role within the software like the callers, callees, number of calls, etc. To explore the capabilities of such an observer it is recommended to test this code in a LISP execution environment.

TABLE 13

```
CL-USER 1 > (load "D:/Documents and
Settings/li62794/Desktop/programming/def-morph.lisp")
; Loading text file D:\Documents and
Settings\li62794\Desktop\programming\def-morph.lisp
; Loading text file D:\Documents and
Settings\li62794\Desktop\programming\Load-Memoization.lisp
; Loading fasl file C:\Program Files\LispWorks Personal\lib\4-4-0-0\load-
on-demand\pcl\macros\loop.fsl
;;; Loading the Common Lisp Automatic Memoization Package
;;; (CLAMP) from D:/Documents and
Settings/li62794/Desktop/programming/.
;;; To change this location, see Memo::*Memoization-Base-Directory*
;;; in the Load-Memoization file.
;;;
;;; The files to be loaded are
;;;; Save-Memo-Table, Memoization, Simple-Metering, and Memoization-
Examples.
;;;; Any of these except Memoization are optional. See
;;; Memo::*Memoization-File-Names* in Load-Memoization.
;;;
;;;; CLAMP assumes that Lisp source files end in '.lisp' and
;;;; compiled files end in '.fsl'. To change these assumptions,
;;; see Memo::*Source-File-Extension* and
;;; Memo::*Compiled-File-Extension* in Load-Memoization.
;;;
;;;; These loadup messages can be suppressed by setting
;;; User::*Verbose-Memoization-Load?* to NIL before loading the
;;; Load-Memoization file.
;;;
; Loading fasl file D:\Documents and
Settings\li62794\Desktop\programming\Save-Memo-Table.fsl
; Loading fasl file D:\Documents and
Settings\li62794\Desktop\programming\Memoization.fsl
; Loading fasl file D:\Documents and
Settings\li62794\Desktop\programming\Simple-Metering.fsl
; Loading fasl file D:\Documents and
Settings\li62794\Desktop\programming\Memoization-Examples.fsl
;;;
;;;; Memoization routines are in MEMOIZATION (MEMO) package.
;;; Use (in-package :Memo) or
;;; (use-package :Memo [<Package>]) to use them.
;;;
;;; The very first time, you need to do
;;; (Memo:Compile-Memoization-System), then
;;; (Memo:Load-Memoization-System)
;;; Thereafter, just load this file, which will load the rest.
; Loading fasl file D:\Documents and
Settings\li62794\Desktop\programming\re-defun.fsl
; Loading text file D:\Documents and
Settings\li62794\Desktop\programming\re-defvar.lisp
#P"D:/Documents and Settings/li62794/Desktop/programming/def-
morph.lisp"
CL-USER 2 > (in-package :morph)
#<PACKAGE MORPH>
MORPH 3 > (defun* fib (N)
    "Returns Nth Fibonacci number, where 0th is 0, 1st is 1,
    and the rest are the sum of the previous two."
    (if
        ((<= N 1)
        N
        (+ (fib (- N 1)) (fib (- N 2))))))
FIB
MORPH 4 > (morph-measure-memoization 'fib 19)
4181
0.125
MORPH 5 > (morph-measure-memoization 'fib 30)
832040
23.72
MORPH 6 > (morph-measure-memoization 'fib 25)
75025
2.141
MORPH 7 > (morph-measure-memoization 'fib 27)
196418
5.594
```

This illustrates that one can instrument a program to measure observable execution events and to derive dynamically observable (inter-) relations between program parts, e.g. caller functions, callee functions, number of calls, the use of variables etc. based on measurements inside a programming environment. Obviously in the above example it is better to use the memoized version of FIB, since for all calls the elapsed time seems to be shorter, i.e. for (fib 19) 0.125 s, for (fib 30) even 23.72 s.

The next part of the invention is the functionality of the observer O being capable of controlling the modifications of the code.

TABLE 14

CL-USER 8 > (morph-fun-instance 'fib)
<DEFUN-CLASS 206A1B84>
T
MORPH 9 > (memoized-logic (morph-fun-instance 'fib))
NIL
MORPH 10 > (logic (morph-fun-instance 'fib))
(IF (<= N 1) N (+ (FIB (− N 1)) (FIB (− N 2))))
MORPH 11 > (comments (morph-fun-instance 'fib))
"Returns Nth Fibonacci number, where 0th is 0, 1st is 1, and the rest are the sum of the previous two."
MORPH 12 > (morph-memoize (morph-fun-instance 'fib))
FIB Obviously there is an instance having the gensym #<DEFUN-CLASS 206A1B84>carrying the programming logic as illustrated by the above inspections. That could be instructed to change the code into a memoize-version.

TABLE 15

MORPH 13 > (memoized-logic (morph-fun-instance 'fib))
(LET ((HASH-TABLE (ECASE HASH-TABLE-SOURCE (:CREATE (MAKE-HASH-TABLE :TEST TEST)) (:DISK (LOAD-SAVED-MEMO-TABLE NAME)) (:OLD-FUNCTION (GET FUNCTION-NAME :MEMO-TABLE))))) (SETF (GET NAME :MEMO-TABLE) HASH-TABLE) (SETF (GET NAME :UNMEMOIZED-FUNCTION) FUNCTION) (SETF (GET NAME :MEMO-TABLE-TEST) TEST) (PROCLAIM (SYSTEM::BQ-LIST (QUOTE NOTINLINE) NAME)) (DECLARE (OPTIMIZE (SPEED 3) (COMPILATION-SPEED 0) (SPACE 0) (SAFETY 0))) (LET ((HASH-KEY (FUNCALL KEY PARAMETERS))) (MULTIPLE-VALUE-BIND (VALUE FOUND?) (GETHASH HASH-KEY HASH-TABLE) (COND (FOUND? (INCF (THE FIXNUM (GET NAME :HASH-TABLE-LOOKUPS))) VALUE) (T (INCF (THE FIXNUM (GET NAME :ORIGINAL-FUNCTION-CALLS))) (SETF (GETHASH HASH-KEY HASH-TABLE) (IF (<= N 1) N (+ (FIB (− N 1)) (FIB (− N 2)))))))))))
MORPH 10 > (morph-measure-memoization 'fib 17)
1597
0.0
MORPH 11 > (morph-measure-memoization 'fib 19)
4181
0.0
MORPH 12 > (morph-measure-memoization 'fib 30)
832040
0.0

With the effect that now the time difference between the usual evaluation of the current version and the memoized version is 0 s.

Every FAQ on programming language contains a huge set of recommendation of code improvements; there are a lot of books on code optimization and structuring techniques, see e.g. the good and bad programming examples in Peter Norvig's and Kent Pitman's "Tutorial on Good LISP programming Style" published at the Lisp users and vendors conference August 1993.

An example of functional preserving code modification is for instance dynamic programming, i.e. to memorize function results for reuse. That requires a data part adaptation of the software that is in most cases luckily uniform. That means results to be memorized should meet all of the following criteria: The return values of the function should not change from call to call, the function should not have side effects, and the function should not take mutable arguments. Clearly, it is futile to memorize functions that can change every time you invoke them. Equally, it is important not to memorize functions that have intentional side effects (functions that update state in some way—which is an observable property and statistically detectable by the outlined observer technique), since the side effects will not be repeated for subsequent calls. It can be dangerous to memorize functions with mutable arguments for the same reason that it can be dangerous to store mutable classes in hash tables. If one calls a memorized function with an argument once, mutates the argument object, then calls the function a second time, the memorizer might see this as a cache hit and not re-compute the value. In short, the wrong value could be returned. Unfortunately, the only way to tell if the code can benefit from memorization is to profile it, i.e. to let an observer decide whether a function is memorizable.

This technique usually (as above shown) called memoization allows a function to "remember" previous invocations, returning the previously calculated values (rather than recalculating) if it is called with exactly the same arguments as in a previous execution. "Automatic" memoization means that an existing function can be transformed into a memoized one without requiring any changes in the code for the function itself. This can result in tremendous speedups if calculations are repeated at various points in a program's execution, yet while remaining somewhat transparent to the users of the code. There are at least four basic applications of memoization. Repetitions within a Function Call: This case, illustrated below, is when a single routine calls some subroutine (or itself recursively) more than is needed, resulting in extra calculations. By memoizing, these results are returned immediately for subsequent calls, with the effect of dynamic programming. In fact, this first case can be thought of as a tool for automatic dynamic programming, but without the need to build the sub-pieces in the correct order. This can frequently reduce the time of exponential algorithms to polynomial or even linear time. Given enough thought, this can be solved without an automatic memoization facility by either building up the sub-pieces in the proper order or maintaining a special purpose local data structure to retain the results. The advantage of doing it automatically is that less debugging and testing is required if the simple algorithm has been already tested, the invention allows changing back and forth when running, it is more transparent, and simple and easy to use. Repetitions over Time: The second case is for invocations of a function that are repeated over time, but from scattered places in the program, or even when revoked repeatedly by a user in an interactive program. This generally yields a speedup by a constant factor, but that factor may be large. Without an automatic memoization facility, the only alternative is maintaining a special purpose global data structure, requiring testing and debugging, and much extra effort for something that at best is equally efficient as memoization.

Off-line Runs: The third case is when a function is so expensive that it has a certain pay-off to perform the calculations off-line and save the results for a later session. The automatic memoization facility provides a simple and transparent method to save the results and have them associated with the function automatically in a later session. Timing and Profiling: The final case is when using memoization as a tool in conventional performance profiling and optimization. The observer could provide some sort of a metering system, and this could be used for major test cases. By using Memoized-Time or With-Memoization, a user can memoize the routines in question then run the same test case multiple times. If the identical test case runs only, say 5% faster even during the second memoized run, then this suggests that no amount of memoization in the routines in question will make more than a 5% difference in the performance of the test case, and that this is likely not the place to begin the optimization efforts.

Memoization is only meaningful for routines that are true functions, not procedures. That is, output must be totally determined by input, and there can be no internal dependency on global variables or other side effects. If a memoized function returns a value that is later destructively modified, then later calls that expect the original value will get the modified value instead. For instance, one rule of thumb for performing destructive operations on lists (nconc, setf on a specific location, sort, etc.) is that it is safe only when the list is newly consed; ie you can guarantee that the function providing you with the list has built it, and thus it does not share structure with lists used elsewhere. However, if the function that builds the list is memoized, it no longer conses the list afresh, and destructive operations can cause problems. Memoization uses EQUAL to compare the current argument list to former ones. If the argument list contains some entry where only EQUALP can recognize that two different objects have identical internal values, undue repetition may result. The SAVE-MEMO-TABLE code depends on having the print representation of an object be such that READ can interpret it again. This is true for lists, symbols, numbers, and strings, but not for arrays, hash tables, CLOS instances, etc. In some of those cases a custom print function could be defined, but in general there is a limitation on the types of values (either input OR output) that can be in memoized functions that will be saved to disk.

Memoization is performed by doing an exact match on the argument list, using EQUAL by default. Similarly, one can have counterintuitive results when the arguments are floating point numbers, forgetting, for instance, that 2 is not EQUAL to 2.0, 1.234567 is not EQUAL to 1.23456, etc., even though your function may treat them as identical. In most cases, memoization is a time vs. memory trade off. In extreme cases where a frequently repeated function generates large structures memoization may actually save memory (no garbage), but in most cases you sacrifice space in order to gain speed. These tradeoffs should be evaluated carefully, using the observer to see how often a function actually repeats, WITH-MEMOIZATION, and MEMOIZED-TIME (which reports time and space for both memoized and un-memoized versions). Luckily all these properties are observable e.g. by simply simulating a test case set of a function with and without memoization. Further details on memoization could be found e.g. in the Proceedings of the Sixth International Symposium on Artificial Intelligence, "Improving Performance of AI Software" by Marty Hall and James Mayfield.

Nevertheless, it is very easy to apply a memorizing wrapper to existing code, and, importantly, it is just as easy to remove a wrapper. This suggests the following simple optimization strategy: Choose a function as a candidate for memorization (semi-) automatically. Add a memorizing wrapper to the function. Observe the behavior of both functions (and the system as a whole). If there is little or no significant performance gain, remove the memorizing wrapper. If the returned values differ, remove the memorizing wrapper. Replace the function by the new (memorized) code (true morphing). Ideally, one could analyze the impact of adding memorization automatically on the system as a whole, since only then one can be sure that it is worth adding. Some methods, even though they are computationally expensive, may not benefit from being memorized, e.g. simply because they are never called with the same arguments more than once.

By applying such a technique an observer could for instance trigger the application of this macro if there are a bunch of repetitive computational expensive, e.g. time complex function calls. Unlike in the above piece of code then an execution is enabled to adapt dynamically itself to remember function calls, not only uniform, i.e. for all calls, but depending on the real execution.

For instance suppose a simple application like a currency conversion, suppose further two different use-profiles, the first profile is the repetitive conversion of prices in a shop. This set of prices together with the conversions will be memorized due to the repetition. A second profile might be a casual use of a traveler. In this profile there will occur unlikely repetitions. Thus there will be almost nothing memorized. Similar arguments support the usage of different use profiles for any more complex translation like e.g. a speech recognizer or any reactive behavior of a user interface. Often repeated input sequences could be memorized by applying this method and will drastically increase reactivity and processing speed.

Another quite simple re-factoring strategy, which is not functionally equivalent, is the dynamic code reduction. Whenever the observer recognizes that a method was not invoked for a long time of operation the code of this operation could be removed. The effect is that such a code modification yields to smaller code size and shorter start up times on the cost of a revision backtracking whenever the function is accidentally used. Dead code is dynamically recognized and eliminated. Note that such an optimization could not be performed in the creation phase P1 since it is an undecidable problem whether a code is dead or alive for any execution.

In a real application scenario a software will purge unused component, e.g. a very special formatting component that was for a long time not used within a word processor could be removed without defecting the effective (really used) functionality.

A large set of conservative re-factoring strategies with the indication for the application and the automatic application of the program transformations could e.g. be found in the dissertation of William F. Opdyke, "Refactoring Object-oriented Frameworks".

Hard-coded behaviors will give way to behaviors expressed as high-level objectives, such as "maximize this utility function," or "find a reputable message translation service." Hardwired connections among elements will give way to increasingly less direct specifications of an element's partners—from specification by physical address to specification by name and finally to specification by function, with the partner's identity being resolved only when it is needed. Hard-wired relationships will evolve into flexible relationships that are established via negotiation. Elements will automatically handle new modes of failure, such as contract violation by a supplier, without human intervention.

The method according to the invention is well suited for service-oriented architectural concepts like Web and grid services or software agents. Viewing autonomic elements as agents and autonomic systems as multi-agent systems makes it clear that agent-oriented architectural concepts will be critically important since functionality and not only invocations or interactions can be exchanged. A typical highly invocated Web service or object in an object-oriented environment could be for instance advantageously automatically integrated or aggregated after the deployment. And to keep track of service updates the observer could be enhanced for detecting functional divergence between the integrated code and the external service; preferably statistically and concurrent to the real use.

Autonomic elements will have complex life cycles, continually carrying on multiple threads of activity, and continually sensing and responding to the environment in which they are situated. Autonomy, proactively, and goal-directed interactivity with their environment could guide developers, e.g. by observing a certain relationship between two parts of the software and automatically suggesting restructuring alternatives with their advantages and disadvantages.

Once a malfunction is detected the knowledge could be distributed throughout all instances of software and the functionality could be blocked by a code modification. When necessary such autonomic software could then even request the author for updates or patches.

Statistical models could support the meta-programming knowledge of the observer, e.g. to identify which modifications in the context of scenarios are helpful. In general the programming rules itself become transparent, which is a new aspect of computer science. The restructuring or higher order programming, i.e. the ability to use functions as values, i.e. functions as arguments to other functions and functions can be the return value of other functions is sparely applied and rather theoretic. This style of programming is mostly used in functional programming, but it can also be very useful in 'regular' object oriented programming and is when applying the invention supported by an engineering method in a natural way.

To sum up the main features is a fully reflective architecture. Prominent features built around this reflective architecture will include unification of functionality abstractions, security based on formal proofs from explicit negotiated axioms as controlled by capabilities, higher-order functions, fine-grained composition, distributed networking, orthogonally persistent storage, fault-tolerant computation, version-awareness, dynamic code re-generation, high-level models of encapsulation, preferably with a highly-performing set of dynamic compilation.

Pervasive and ubiquitous computing in an everyday changing environment with evolving requirements is a technical challenge. Known techniques to cope with are program transformation, interpreters, abstract (virtual) machines, compiler techniques, intelligent agent technology, evolving and dynamic algebras, and higher order programming languages.

Technically one of the first approaches to adapt evolving (changing) environments was memory dispatcher in operating systems and garbage collectors. They adapt the operating environment to the need of a static program resource.

The program resource itself is until today treated as a static constant image although programmatic evolution takes place. There is a strict separation between development phase and execution phase.

The just in time compiler technologies and the higher order programming language environments allow dynamic compilation and optimization. Advanced environments like LISP and ProLog even support code modification while execution. Until today, no controlling instance was known supporting code morphing. (Morphing capability of a system means the ability to dynamically modify its runtime.)

The algebraic concept "Evolving Algebra" (EA) provides the necessary semantics foundation for the invention. The EA thesis can be stated as follows: Every algorithm can be simulated on its natural abstraction level by an appropriate EA. The main goal of the evolving algebra methodology is to provide succinct and executable formal specifications for algorithms.

Changing environments will come up in the next years. The effects are already known: broken references or links, missing resources, incompatibilities and so on. The static coding applied in today's system yield (in the case of sound (complete) requirement coverage) huge untractable software packages due to the multiple variants. When the interaction interfaces between two software pieces changes such software is lost. Due to the rather static software world the current method can cope with altering requirements but it is far away from the ideal smart solution.

The solution out of this is a system where the components or parts are treated as self-organizing individual entities restructuring themselves stimulated by outside interactions. The system comprises observable and evolving components for changing itself. One important part of the system is the definition of an executable semantics by identifying the "programming building blocks" on which to perform program evolution.

The suggested technology enables algorithm that can "learn" and change its behavior by comparing the results of its actions with the goals that it is designed to achieve. An algorithm is a procedure, which can be written as a set of steps, for producing a specific output from a given input. The suggested feedback control is a process by which output or behavior of a machine or a system is used to change its operation in order to constantly reduce the difference between the output and a target value. Morphing software individuals i.e. the ability to dynamically modify its run-time (or in terms of an agent communication system the agents' responsibility) based architecture is a framework for defining software systems that are capable of self-modification and of reproduction on the level of an interpretive programming language.

In abstract terms, a self modifying system comprises an observer instance, an evolution history, and a current image, where the observer is capable of inspecting dynamic aspects like interactions between software parts at a run, a history, i.e. a collection of evolution snap shots like revisions or versions, and the image is as (living) runtime. A computation in such a system causes observable events and triggers modifications of the image.

In order to illustrate the dynamic of the method a set of use cases is described below. Assume an object system environment comprising an object oriented data base management system for persistent object histories, i.e. frozen instances, and living instances within an image. The objects, i.e. nearly everything like variables, methods, classes, instances, relations, messages, aggregations etc. have properties. The observer detects effects caused by certain events that happen while execution updates these properties. The system could also comprise interfaces to the outside world, where (observable) interaction with the system boundaries happens and will be made observable—stimulating a reactive behavior.

Suppose further an system of object instances of classes comprising class and instance variables, class methods and instance methods with selections, decisions, iterations, recursions (method invocations) and other usual object oriented constructs. An observer updating the property continuously in an operative state observes each of these constructs. Such properties are illustrated e.g. with variable properties like the number of accesses, the accessing instances, or the number of updates (modifications) etc.

A pattern of events (memorized in the properties) can trigger a modification like a migration of an instance variable common to all instances into a class variable or a migration of a global variable into an instance—or class variable or the exchange of slots between classes (inclusive dependencies) etc.

Incremental small improvements are recommended since even small structural changes within the components of distributed (complex) systems could result in unforeseen system behavior. The evolution history could be used to perform regression tests in an automatic way to increase confidence in the correctness of a program transformation history.

There is a set of heuristic improvement, e.g. the drop of seldom-used code fragments or the aggregation of class or object relations. Furthermore there are bunches of (conservative) program transformations known from compiler technology. Before a (heuristic) modification the environment might freeze the evolution state of the image in order to enable back tracking.

This technology enables to accumulate execution knowledge in individuals like components, instances, or agents). E.g. if a certain behavior of agent A, say, is frequently used (at runtime) only by agent B, agent A could decide to move this behavior to agent B by adding involved (methods) and schemes (classes) to agent B. Vice versa might agent C require a first capability of agent A and agent B a second capability of A. The observer recognizes the situation from statistical observations and triggers a split of A into A1 and A2; after the split the parts are respectively melted into the agent B and C.

Figure 5:
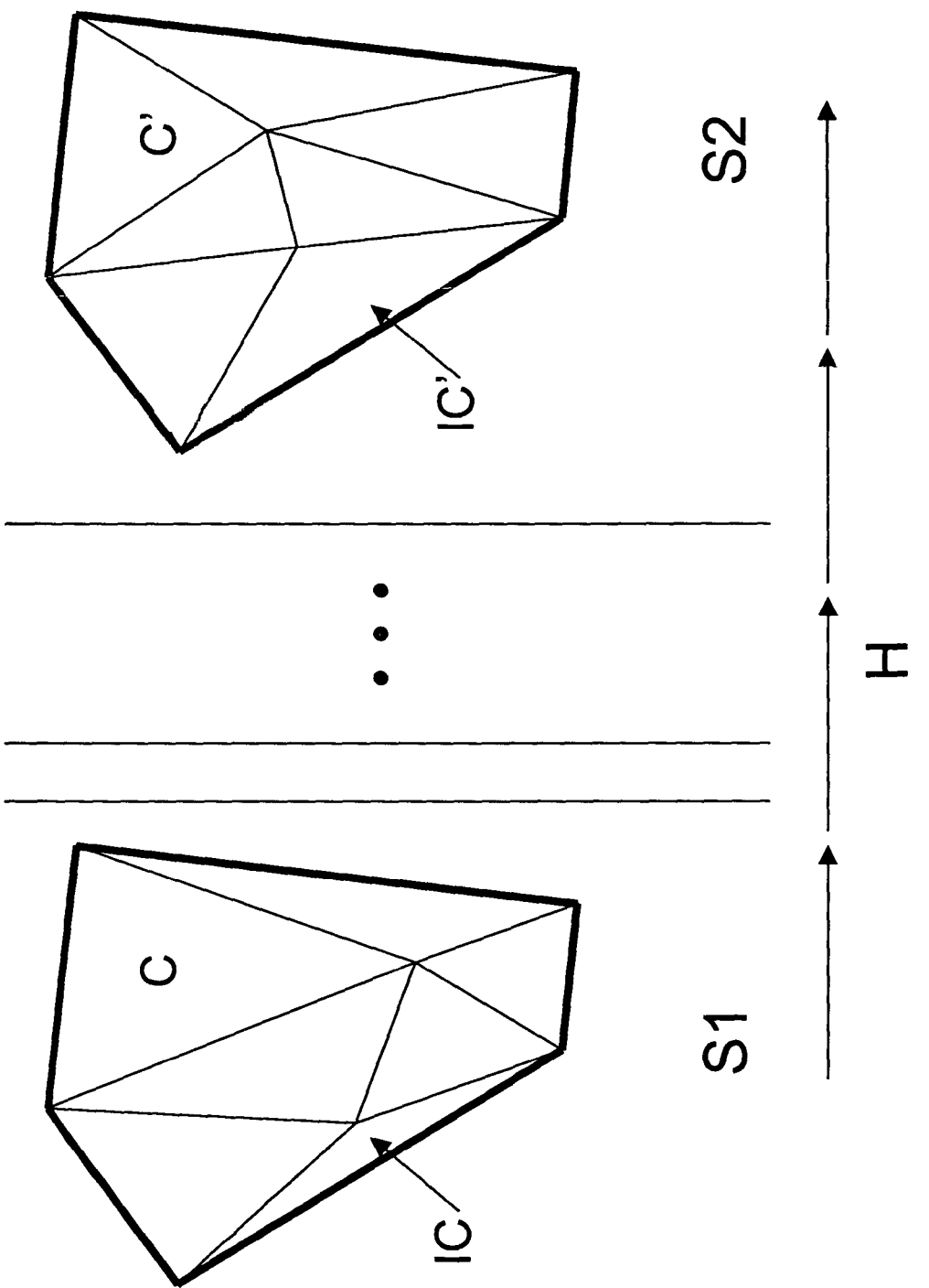
FIG. 5, shows an evolution history, schematically.

Such a scenario is illustrated in FIG. 5, showing an evolution history H of software S1, S2. The software S1, S2 is shown as a triangulation of a polygon where the triangles are model components C, C' of the software. The polygon shape could be regarded as the boundary of the software. The history begins with initial evolution software S1 comprising among other components C an improvable component IC. Suppose the observable property is the harmony of the triangulation where the area is a measure for some (measurable) complexity of a component like the elapsed time. In the evolved version of this software S2 the triangulation seems to be more harmonic, i.e. the components have been morphed in a kind of improved configuration/distribution/arrangement.

The method enabled the intelligent and automatic application of optimizations and reorganization of behavior of methods (functions) like a memorizer (generic caching wrapper). Their prerequisites are that the return values of the method should not change from call to call and the method should not have side effects. The method should not take mutable arguments. Then an efficient caching wrapper could enhance reactivity drastically. Another reorganization is (dynamic) partial evaluation. Partial evaluation creates a specialized version of a general program. The specialized program may be much more efficient and runs faster than the general one. Let P be a program, which takes two inputs D1 and D2. Ordinarily, the application of P to (D1, D2) would be evaluated in one step: Evaluate P with input (D1, D2), to produce the result res. However, alternatively it may be evaluated in two steps according to the Curry-Howard homomorphism): First partially evaluate P with input D1 which produce a new program R, say, a parameterized version of P. Then evaluate R with input D2, to produce the result. The program R is a specialized version of P (for the particular value D1 of the first input), and is called a residual program. The process of producing R is called partial evaluation, or program specialization. One benefit of partial evaluation is speed of execution: the specialized program r is often much faster than the general program P another one is interface efficiency and simplification of aggregation.

Realizing morphing agents, programming languages supporting dynamic object oriented programming have to be used, which incorporate the ability to change programs (classes) and structures at runtime by providing a powerful meta object protocol. Dynamic object-oriented programming is a software development technology that enables applications to be tailored during development and after deployment without access to source code. The proposed environment comprises therefore dynamic objects (changes at runtime=evolution), object persistency (store/retrieve object structures and methods=versioning), (interactive) code manipulation (incremental change-eval/compile-run cycle), a meta object protocol (reflection/reasoning about objects) is suggested.

The invention deals with a two level architecture of a "code-evolving environment" (micro steps enhancing a program by evolution) in contrast to program synthesis (macro steps generating a program from a description). Level 1: called "Environment" responsible for: observing individuals (program constructs), micro-changing individuals (program transformation), metering behavior (statistics as well as heuristics), learning (new rules, updating rules, object base (=knowledge) update or inference (e.g. programming by example) source update (with generated comments) event. knowledge base; etc.

Level 2: called "Target Program" (the current version of the software, which is to be developed). The target has components like package, class, instance, etc. down to every program construct, where each such construct has a "model" in the environment. This model together with modification, observation-rules enables the environment to suggest evolution steps. The following is a list of concepts/methods/conditions, leading to (semi automatic) program modification.

If the system decides the task performance can be improved by restructuring the knowledge of participating individuals (instances, agents) more efficiently the individuals themselves may carry out the restructuring.

Incremental small improvements are recommended since even small structural changes within the components of distributed (complex) systems could result in unforeseen system behavior.

The concept of autonomous program manipulation in the large allows for manipulations that affect a program globally, not only locally in one module. Two in-the-large examples might be inter-module renaming and reorganizing. In order to find criteria to guide the usage of the reorganizing the application of known (static) software metrics are proposed. Such metrics might be based on the principle of vocabulary hiding and measure excess visibility. The more excess visibility there is, i.e., the more visible items are not used, the lower the metric values. A number of static software metrics were developed to increase software quality. These metrics serve as a surprising good indicator to poorly structured project parts.

The invention claimed is:
1. A method for automatically adapting a computer program product to an environment, the computer program product comprising executable parts and data parts, the method comprising:
configuring the computer program product for the environment and executing a computer program comprised by the computer program product in the environment;

observing effects of the execution by metering a behavior of the executable parts;
analyzing the inter-relation of the observed effects with the computer program product;
modifying executable parts based on rules in order to reduce undesirable observed effects comprising one or more of inefficiency and failure; and
making modifications or states of the code part persistent wherein the observed effect is a repetitive behavior and the modifying comprises adding a memorization for the repetitive behavior.

2. The method according to claim 1, wherein the observed effect further includes a detection of dead code and the modifying comprises the elimination of the identified dead code.

3. The method according to claim 1, wherein the observed effect further includes a detection of a tight relationship between two parts and the modifying comprises re-structuring the two parts together by one or more of placing an interacting object within the same component, aggregating foreign called methods, and placing variables in the appropriate scope.

4. The method according to claim 1, wherein the observed effect further comprises a partial evaluation x and the modifying comprises y, a more efficient partial evaluation with f_x with f(x,y) =f_x (y).

5. The method according to claim 1, wherein the observing, analyzing and adapting is performed while executing the computer program, where the adapting is performed in the background.

6. The method according to claim 1, wherein previous versions are compared with a current version with respect to the undesirable effects and the functional equivalence.

7. A computer program product stored in persistent storage and automatically adapting to an environment, the computer program product comprising:
executable parts and data parts;
a configuration component that configures the computer program product for the environment for executing the computer program product in the environment;
an observation component that observes effects of the execution, including the behavior of the executable parts;
an inference component that analyzes an inter-relation of the observed effects with the computer program product; a restructuring component that modifies executable parts based on rules in order to reduce undesirable effects comprising one or more of inefficiency and failure; and
a revision manager component (RM) that makes modifications or states of the code part persistent;
wherein the observed effect comprises a detection of a tight relationship between two parts and the modifying comprises re-structuring the two parts together by placing an interacting object within the same component.

8. The computer program product according to claim 7, further comprising:
a programming component that implements a method for automatically adapting a computer program to an environment, the computer program product comprising executable parts and data parts, the method comprising:
configuring the computer program product for the environment and executing a computer program comprised by the computer program product in the environment;
observing effects of the execution by metering a behavior of the executable parts;
analyzing the inter-relation of the observed effects with the computer program; and
modifying executable parts based on rules in order to reduce undesirable observed effects comprising one or more of inefficiency and failure.

9. A method for manufacturing an automatically adapting computer program product, wherein the method comprises:
furnishing the executable part by integrating an observation component that observes effects of the execution, including the behavior of the executable parts;
furnishing the executable part via an inference component that analyzes the inter-relation of the observed effects with the computer program product; and
furnishing the executable part via a restructuring component that modifies executable parts based on rules in order to reduce undesirable effects;
the computer program product comprising:
executable parts and data parts;
a configuration component for configuring the computer program product for the environment for executing the computer program product in the environment;
an observation component for observing the behavior of the executable parts;
an inference component for analyzing the inter-relation of the observed effects with the computer program product;
a restructuring component for modifying executable parts based on rules in order to reduce undesirable effects; and
a revision manager component (RM) that makes modifications or states of the code part persistent;
wherein the observed effect comprises a detection of a tight relationship between two parts and the modifying comprises re-structuring the two parts together by placing an interacting object within the same component.

10. The method according to claim 9, wherein a developer is notified about at least one of the observing, the analyzing and the adapting.

11. A method of automatically adapting a computer program product to an environment, the computer program product comprising executable parts and data parts, the method comprising:
configuring the computer program product for the environment and executing a computer program comprised by the computer program product in the environment;
observing effects of the execution;
metering a behavior of the executable parts;
analyzing the inter-relation of the observed effects with the computer program;
modifying executable parts based on rules in order to reduce undesirable observed effects comprising at least one of inefficiency and failure;
wherein the observed effect comprises a detection of a tight relationship between two parts and the modifying comprises re-structuring the two parts together by placing an interacting object within the same component.

12. The method according to claim 11, wherein the observed effect further comprises a detection of dead code and the modifying comprises the elimination of the identified dead code.

13. The method according to claim 11, wherein the observed effect further comprises a repetitive behavior and the modifying comprises adding a memorization for the repetitive behavior.

14. The method according to claim 11, wherein the observed effect further comprises a partial evaluation x and the modifying comprises y, a more efficient partial evaluation with f_x with f(x,y) =f_x (y).

15. The method according to claim 11, wherein the observing, analyzing and adapting is performed while executing the computer program, where the adapting is performed in the background.

16. The method according to claim 11, further comprising making modifications or states of the code part persistent.

17. The method according to claim 11, and wherein restructuring the two parts together further comprises one or more of, aggregating foreign called methods, and placing variables in the appropriate scope.

* * * * *